March 14, 1950 B. J. EDWARDS 2,500,633

APPARATUS FOR REPRODUCING RADIOLOCATION INTELLIGENCE AT A REMOTE POINT

Filed Nov. 15, 1944

Inventor
B. J. EDWARDS.
By Emery, Holcombe & Blair
Attorneys

Patented Mar. 14, 1950 2,500,633

UNITED STATES PATENT OFFICE 2,500,633

APPARATUS FOR REPRODUCING RADIO-LOCATION INTELLIGENCE AT A REMOTE POINT

Baden John Edwards, Cambridge, England, assignor to Pye Limited, Cambridge, England, a British company Application November 15, 1944, Serial No. 563,554
In Great Britain August 13, 1943

6 Claims. (Cl. 343—10)

The present invention relates to means for reproducing at a remote point, and over a wire or wireless link, the information contained on the cathode ray tube of a radiolocation apparatus. In such apparatus the beam is scanned radially and simultaneously rotated around the axis of the tube, and in order to reproduce the image at a remote station it has been necessary, prior to the present invention, to employ complex synchronising arrangements between the two stations, and particular difficulties have been experienced in obtaining synchronism when the beam at the radiolocation station is stopped and "inched" in order to obtain the bearing of any particular aircraft.

The present invention provides a simple solution of this problem by causing the rotating beam at the radiolocation station to scan a mosaic and by employing a second beam to scan the mosaic in straight and substantially parallel lines, like ordinary television scanning, whereby the signals may be transmitted over the link and received at the remote station by means of conventional television apparatus, without the difficulties of synchronising rotating beams at the two stations.

For carrying this invention into effect, a double-ended cathode ray tube may be employed having beam-forming means at opposite ends thereof, in between which is arranged a mosaic screen which is scanned on opposite sides by the two beams. The scanning of the mosaic by the modulated beam causes the elementary particles of the mosaic to be charged up in dependence upon the modulation applied to the beam at the instant at which it passes over a particle, thus forming an electron image on the mosaic. The second beam which scans the opposite side of the mosaic discharges the particles, the electrons emitted therefrom being collected by a collecting electrode arranged adjacent to the mosaic. The fluctuating potentials arising at the collecting electrode are then amplified and used to modulate a television transmitter.

An alternative form of cathode ray tube which may be employed has the mosaic screen and the two beam forming means arranged so that the mosaic is scanned from the same side by the two electron beams. In this case, of course, it is necessary to offset the electron guns, which gives rise to a geometrical distortion of the image, but this may be corrected by well-known means.

In order that the invention may be more clearly understood, some embodiments thereof will now be described with reference to the accompanying diagrammatic drawings in which Fig. 1 depicts a double-ended form of cathode ray tube which can be used in the apparatus according to the invention.

Figure 1:
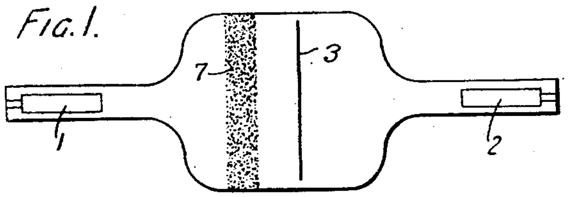
Figure 2:
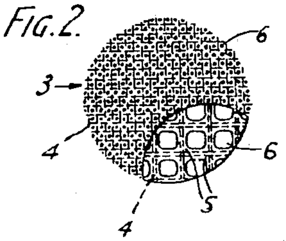
Fig. 2 depicts on an exaggerated scale one form of construction of the mosaic screen that may be employed in the tube of Fig. 1, a portion of the screen being represented as highly magnified.

Fig. 1 represents a double-ended cathode ray tube having beam-forming guns, indicated at 1 and 2, at the opposite ends thereof and between which is arranged a mosaic screen 3 so as to be scanned on opposite sides by the two beams. The mosaic screen 3 may be constructed in any suitable manner, for instance as a fine wire mesh coated with an insulating layer and then having small metallic or conducting particles inserted in the mesh. Fig. 2 illustrates such a form of mosaic screen constituted by a fine copper wire mesh 4 which, as depicted in the highly magnified portion of the figure, is coated with glass insulation 5 so as to leave small apertures in the glass corresponding to the meshes in the wire. These apertures are then filled with a material, such as zinc sulphide, which can be easily reduced to a metal, the material then being reduced to the metal so as to produce a screen 3 comprising discrete metallic particles 6 carried in the glass insulation between the meshes of the wire. Adjacent to the mosaic 3 is provided a collecting electrode which may, for example, and as shown, be in the form of a conducting coating 7 of graphite deposited on the wall of the tube surrounding the mosaic 3 on the side which is scanned in straight lines by the second beam.

Figure 3:
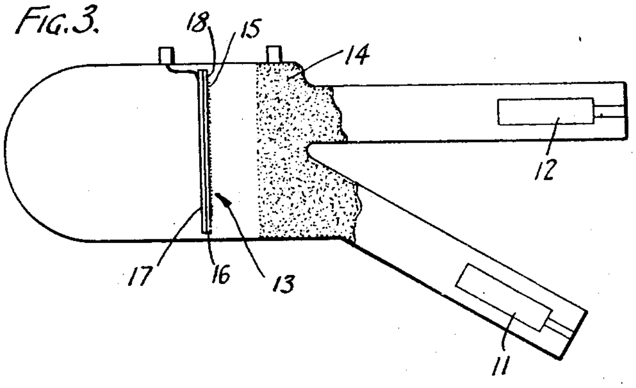
Fig. 3 depicts an alternative form of cathode ray tube.
Figure 4:
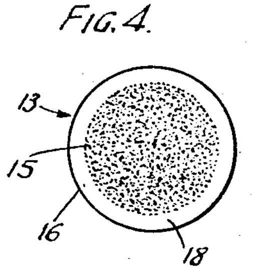
Fig. 4 depicts another form of mosaic screen employed in the tube of Fig. 3.

In another embodiment as illustrated in Fig. 3, the cathode ray tube may be constructed with the beam-forming guns 11 and 12 arranged at the same side of the mosaic screen indicated generally by 13 so that the screen is scanned from the same side by the two electron beams. The final anode of the beam-forming system is indicated as a graphite coating 14 on the tube wall. The screen 13 may be formed by discrete metallic particles 15 deposited, for example by evaporation, upon one side of a mica plate 16 having on the other side a metal backing 17 which constitutes the collecting electrode corresponding to the electrode 7 of Fig. 1. As depicted in Fig. 4, it is advantageous to provide the mica plate 16 with a margin 18, or equivalently, a surrounding mica ring, which is free from the metallic mosaic 15, and to coat this surround 18 with fluorescent material, for the purpose of facilitating the focussing of the beams upon the mosaic 15. By preliminarily focussing a beam on to the fluorescent surround 18, it can be seen visually, from the glowing spot produced, when the beam is properly focussed.

It will be appreciated that since the mosaic is scanned by two beams with different coordinates these beams must cross one another at various points, at which points electron current will flow which will give rise to spurious signals. These signals can, however, be eliminated by discriminating means, or, alternatively, the two beams may be caused to scan the mosaic alternately so that such spurious signals cannot arise.

The form of mosaic screen 3 employed in conjunction with a separate collector electrode 7, as described with reference to Fig. 1 may be incorporated in the form of tube exemplified by Fig. 3, in place of the mosaic screen 13, the screen 3 in that case being scanned from the same side by the two beams. Such a modification is depicted, incidentally, by the tube 19 in the schematic circuit arrangement shown in Fig. 5, although it will be apparent, of course, that the tubes of Fig. 1 and Fig. 3 may be employed in the circuit instead.

Figure 5:
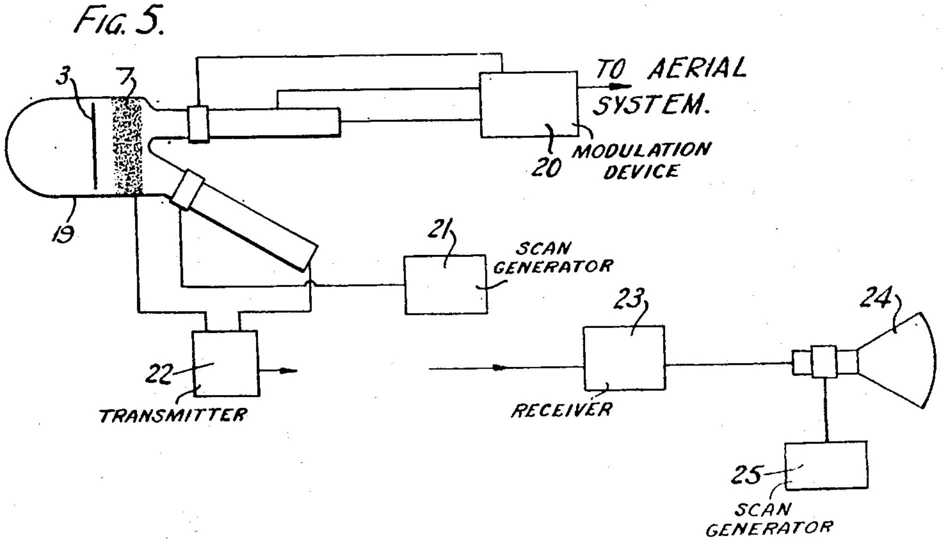
Fig. 5 is a schematic circuit diagram.

The circuit diagram of Fig. 5 illustrates an arrangement according to the invention for reproducing at a remote point the information received on the cathode ray tube of a radiolocation apparatus. At the radiolocation station a cathode ray tube constructed in accordance with the invention is employed, such as the tube 19, and the rotating radially scanned beam which follows the rotation of the aerial system is modulated by the modulating device 20 in accordance with the intelligence received by the aerial system and caused to scan the mosaic screen, e. g. screen 3, of the tube to produce thereon an electron image of the received intelligence. With a suitable scan generator 21, the second beam produced in the tube is caused to scan the mosaic screen in straight and substantially parallel lines as in ordinary television scanning, whereby in the manner previously described the mosaic is discharged and the emitted electrons collected by the collecting electrode, e. g. electrode 7, of the tube as fluctuating potentials which are amplified and used to modulate a transmitter 22. The signals are transmitted over a wire or wireless link and received at the remote station by means of a conventional television apparatus schematically indicated as including a receiver 23, a conventional cathode ray viewing tube 24 and scan generator 25 therefor, the received signals being reproduced for viewing on the screen of the tube 24.

I claim:

1. Radiolocation apparatus in which the intelligence received at a radiolocation receiving station is to be reproduced at a remote point, comprising, at said radiolocation receiving station, a mosaic screen, means for generating an electron beam, means for modulating said beam with the intelligence received at the radiolocation receiving station, means for causing said modulated beam to scan said screen with a rotating radial scan so as to impress an electron image on the screen corresponding to the intelligence received, means for generating a second electron beam, means for causing said second electron beam to scan said mosaic screen with a substantially parallel linear scan to produce fluctuating potentials in accordance with the electron image impressed upon the screen by the first beam, means for collecting said fluctuating potentials to produce a waveform, a television transmitting apparatus, and means for modulating said television transmitting apparatus by said waveform.

2. Radiolocation apparatus in which the intelligence received at a radiolocation receiving station is to be reproduced at a remote point, comprising, at said radiolocation receiving station, a mosaic screen, means for generating an electron beam, means for modulating said beam with the intelligence received at the radiolocation receiving station, means for causing said modulated beam to scan one side of said screen with a rotating radial scan so as to impress an electron image on the screen corresponding to the intelligence received, means for generating a second electron beam, means for causing said second electron beam to scan the opposite side of said mosaic screen with a substantially parallel linear scan to produce fluctuating potentials in accordance with the electron image impressed upon the screen by the first beam, means for collecting said fluctuating potentials to produce a waveform, a television transmitting apparatus, and means for modulating said television transmitting apparatus by said waveform.

3. Radiolocation apparatus in which the intelligence received at a radiolocation receiving station is to be reproduced at a remote point, comprising, at said radiolocation receiving station, a mosaic screen, means for generating an electron beam, means for modulating said beam with the intelligence received at the radiolocation receiving station, means for causing said modulated beam to scan one side of said screen with a rotating radial scan so as to impress an electron image on the screen corresponding to the intelligence received, means for generating a second electron beam, means for causing said second electron beam to scan the same side of said mosaic screen with a substantially parallel linear scan to produce fluctuating potentials in accordance with the electron image impressed upon the screen by the first beam, means for collecting said fluctuating potentials to produce a waveform, a television transmitting apparatus, and means for modulating said television transmitting apparatus by said waveform.

4. Radiolocation apparatus in which the intelligence received at a radiolocation receiving station is to be reproduced at a remote point, comprising, at said radiolocation receiving station, a mosaic screen consisting of a fine wire mesh coated with insulation and having small conducting particles inserted in the mesh and insulating from the wire thereof by said insulation, means for generating an electron beam, means for modulating said beam with the intelligence received at the radiolocation receiving station, means for causing said modulated beam to scan said screen with a rotating radial scan so as to impress an electron image on the screen corresponding to the intelligence received, means for generating a second electron beam, means for causing said second electron beam to scan said mosaic screen with a substantially parallel linear scan to produce fluctuating potentials in accordance with the electron image impressed upon the screen by the first beam, a collecting electrode separate from said screen and arranged adjacent thereto for collecting said fluctuating potentials, a television transmitting apparatus operating with the same number of lines and frame frequency as said linear scan, and means for modulating said television transmitting apparatus by the output from said collecting electrode.

5. Radiolocation apparatus in which the intelligence received at a radiolocation receiving station is to be reproduced at a remote point, comprising, at said radiolocation receiving station, a mosaic screen consisting of a plate of insulating material having conducting particles deposited as a mosaic on one side thereof and having a conducting backing on the other side thereof constituting a collecting electrode, means for generating an electron beam, means for modulating said beam with the intelligence received at the radiolocation receiving station, means for causing said modulated beam to scan the side of said screen having the conducting particles thereon with a rotating radial scan so as to impress an electron image on the screen corresponding to the intelligence received, means for generating a second electron beam, means for causing said second electron beam to scan the same side of said mosaic screen with a substantially parallel linear scan to produce fluctuating potentials in accordance with the electron image impressed upon the screen by the first beam, said fluctuating potentials being collected by said collecting electrode, a television transmitting apparatus operating with the same number of lines and frame frequency as said linear scan, and means for modulating said television transmitting apparatus by the output from said collecting electrode.

6. Radiolocation apparatus in which the intelligence received at a radiolocation receiving station is to be reproduced at a remote point, comprising, at said radiolocation receiving station, a mosaic screen, means for generating an electron beam, means for modulating said beam with the intelligence received at the radiolocation receiving station, means for causing said modulated beam to scan said screen with a rotating radial scan so as to impress an electron image on the screen corresponding to the intelligence received, means for generating a second electron beam, means for causing said second electron beam to scan said mosaic screen at alternate intervals of time with said first beam and with a substantially parallel linear scan to produce fluctuating potentials in accordance with the electron image impressed upon the screen by the first beam, means for collecting said fluctuating potentials to produce a waveform, a television transmitting apparatus, and means for modulating said television transmitting apparatus by said waveform.

BADEN JOHN EDWARDS.

REFERENCES CITED

The following references are of record in the file of this patent:

UNITED STATES PATENTS

| Number | Name | Date |
|---|---|---|
| 2,077,442 | Tedham et al. | Apr. 20, 1937 |
| 2,173,257 | Klemperer | Sept. 19, 1939 |
| 2,180,944 | Linsell | Nov. 21, 1939 |
| 2,280,191 | Hergenrother | Apr. 21, 1942 |
| 2,293,899 | Hanson | Aug. 25, 1942 |
| 2,365,476 | Knoop, Jr. et al. | Dec. 19, 1944 |
| 2,412,669 | Bedford | Dec. 17, 1946 |
| 2,412,670 | Epstein | Dec. 17, 1946 |

FOREIGN PATENTS

| Number | Country | Date |
|---|---|---|
| 542,634 | Great Britain | Jan. 21, 1942 |